US006373869B1

(12) United States Patent
Jacob

(10) Patent No.: US 6,373,869 B1
(45) Date of Patent: Apr. 16, 2002

(54) SYSTEM AND METHOD FOR GENERATING COHERENT RADIATION AT ULTRAVIOLET WAVELENGTHS

(75) Inventor: James J. Jacob, Aptos, CA (US)

(73) Assignee: Actinix, Soquel, CA (US)

( * ) Notice: Subject to any disclaimer, the term of this patent is extended or adjusted under 35 U.S.C. 154(b) by 0 days.

(21) Appl. No.: 09/364,171

(22) Filed: Jul. 29, 1999

Related U.S. Application Data

(60) Provisional application No. 60/094,654, filed on Jul. 30, 1998, and provisional application No. 60/096,270, filed on Aug. 12, 1998.

(51) Int. Cl.$^7$ ................................................ H01S 3/10
(52) U.S. Cl. ............................... 372/22; 372/5; 372/57; 359/326
(58) Field of Search ................... 372/235, 57; 359/326, 359/330

(56) References Cited

U.S. PATENT DOCUMENTS

| 4,297,600 A | 10/1981 | Trutna, Jr. ................... 307/426 |
| 5,144,630 A | 9/1992 | Lin .............................. 372/22 |
| 5,742,626 A | 4/1998 | Mead et al. .................... 372/22 |
| 5,912,910 A | * 7/1999 | Sanders et al. ................ 372/22 |

OTHER PUBLICATIONS

W. Mückenheim, P. Lokai, B. Burghardt, and D. Basting, "Attaining the Wavelength Range 189–197 nm by Frequency Mixing in β–BaB$_2$O$_4$," *Applied Physics B*, Springer–Verlag (1988), pp. 259–261.

G.C. Bhar, U. Chatterjee, A.M. Rudra and P. Kumbhakar, "Generation of tunable 187.9–196–nm radiation in β–Ba$_2$BO$_4$,"*Optics Letters*, vol. 22, No. 21, Nov. 1, 1997, pp. 1606–1608.

R. Hilbig and R. Wallenstein, "Narrowband tunable VUV radiation generated by nonresonant sum–and difference–frequency mixing in xenon and krypton," *Applied Optics*, vol. 21, No. 5, Mar. 1, 1982, pp. 913–916.

"Injection seeding for the enhancement of high–order anti–Stokes stimulated Raman scattering," *Tuesday Afternoon* (May 23), CtuO5, 5:30 PM, CLEO '95, p. 145.

* cited by examiner

*Primary Examiner*—Leon Scott, Jr.
(74) *Attorney, Agent, or Firm*—Fenwick & West LLP

(57) ABSTRACT

An optical system for producing ultraviolet radiation includes an optical source, an optical parametric oscillator (OPO), a frequency doubler, and a mixer. The optical source produces a first beam of radiation. The OPO receives a first portion of the first beam of radiation and produces a second beam of radiation therefrom. The frequency doubler receives a second portion of the first beam of radiation and produces the second harmonic thereof. The mixer mixes the second beam of radiation and the second harmonic of the first beam of radiation to produce an ultraviolet beam of radiation. In a preferred embodiment, the optical source includes a Nd:YAG laser which is frequency doubled to produce a first beam of radiation at a wavelength of approximately 532 nm; and the ultraviolet beam of radiation has a wavelength close to one of the excimer laser lines, typically either 193 nm or 157 nm.

34 Claims, 6 Drawing Sheets

SYSTEM AND METHOD FOR GENERATING COHERENT RADIATION AT ULTRAVIOLET WAVELENGTHS

CROSS-REFERENCE TO RELATED APPLICATIONS

This application claims the benefit of U.S. Provisional Patent Application Ser. No. 60/094,654, "OPO Sum Frequency Generation System for 193 run", by James Jeffery Jacob, filed Jul. 30, 1998, and of U.S. Provisional Patent Application Ser. No. 60/096,270, "Nd:YAG Laser Pumped Raman Shifter: An Alternative Source for 157 nm", by James Jeffery Jacob, filed Aug. 12, 1998; both of which subjects matter are incorporated herein by reference.

BACKGROUND OF THE INVENTION

1. Field of the Invention

This invention relates generally to laser systems and, more particularly, to optical systems for producing coherent, ultraviolet radiation.

2. Description of the Related Art

As technology progresses, there is an increasing demand for ever more powerful integrated circuits or, equivalently, a demand to include ever more circuitry into silicon chips that form integrated circuits. The result is that the circuits are reduced to ever smaller dimensions, requiring that ever finer features must be patterned during the manufacturing process. In order to meet this demand, the microlithography tools which are used to pattern such fine features have also been required to operate at ever shorter wavelengths, with the most recent generation of tools moving toward lasers that produce radiation beams with wavelengths in the ultraviolet region of the electromagnetic spectrum.

Excimer lasers are commonly used to produce the ultraviolet beams required by such microlithography tools. Specifically, the krypton fluoride (KrF) laser is commonly used to produce ultraviolet radiation at a wavelength of 248 nanometers (nm) (i.e., in the deep ultraviolet or DUV portion of the electromagnetic spectrum); the argon fluoride (ArF) laser is commonly used to produce radiation at a wavelength of 193 nm (i.e., also in the DUV); and the fluorine (F2) laser is commonly used to produce radiation at a wavelength of 157 nm (i.e., in the vacuum ultraviolet or VUV). These excimer lasers can produce ultraviolet radiation suitable for the patterning of fine features. As a result, a significant amount of work has occurred toward producing microlithography tools based on these lasers.

However, excimer lasers also suffer from significant drawbacks. For example, excimer lasers typically are expensive and require constant maintenance due to contamination produced by the laser discharge. In addition, the radiation produced by these lasers is fixed at certain wavelengths (i.e., excimer lasers generally are not wavelength tunable) and the beams produced can be of low quality. Excimer lasers typically cannot produce pulses at repetition rates greater than about 2 kHz, making them unsuitable for applications which require high pulse repetition rates. In addition, for applications which require that the laser deliver radiant energy at a certain rate, an excimer laser typically will use a small number of high power pulses rather than a larger number of lower power pulses due to the repetition rate limitation. However, this can lead to damage and/or reduced life for optics in the laser system due to the high peak powers of each pulse.

Hence, there is a need for alternate sources of coherent, ultraviolet radiation, both as an alternative and as a complement to excimer lasers. For example, a source capable of producing ultraviolet pulses at high repetition rates would be a viable alternative to excimer lasers for certain applications. Similarly, a lower power ultraviolet system would also be a viable alternative to excimer lasers for certain applications, particularly if the lower power system had other advantages such as lower cost, higher quality beams and/or simpler maintenance. Even in cases where an excimer laser is a good choice for a particular microlithography application, the application itself may generate an ancillary demand for alternate sources at similar wavelengths to complement the excimer laser. For example, components used in the microlithography application may need to be inspected at the same ultraviolet wavelengths at which they will be used. Optics used in the microlithographic application may be interferometrically tested for quality; photomasks may be inspected and/or measured; and photoresist may be tested for exposure characteristics, all at the same ultraviolet wavelength at which they are intended to be used. For various reasons, sources other than excimer lasers may be preferred for these ancillary tasks.

Systems based on frequency-shifted dye lasers are one alternative source to excimer lasers. Dye lasers, however, have significant drawbacks which limit their practicality. Dyes, being liquids, are inherently messier than, for example, solid state devices. Dye lasers are also more complex than, for example, solid state lasers because the dyes typically require a pumping system to circulate the dyes within the laser cavity. Furthermore, dyes and/or the solvents used with them may be environmentally hazardous, thus requiring appropriate procedures for handling and disposal.

Systems based on solid state lasers are also capable of generating radiation at ultraviolet wavelengths. However, systems such as Alexandrite lasers typically are not capable of repetition rates higher than 20 Hz. In addition, many solid state systems typically rely on multiple stages in which a non-linear crystal is used to shift the wavelength of incoming radiation. However, most such systems require a large number of stages in order to achieve the desired ultraviolet wavelength, and this is undesirable because each stage adds complexity and reduces the optical efficiency of the overall system.

Thus, there is a need for optical systems which can produce ultraviolet radiation, particularly at wavelengths similar to those produced by excimer lasers, but which additionally overcome some or all of the shortcomings discussed above.

SUMMARY OF THE INVENTION

In accordance with the present invention, an optical system for producing a coherent beam of ultraviolet radiation includes an optical source, an optical parametric oscillator (OPO), a frequency doubler, and a mixer. The optical source produces a first beam of coherent radiation. The OPO is disposed to receive a first portion of the first beam of radiation to produce a second beam of radiation from the first portion. The frequency doubler is disposed to receive a second portion of the first beam of radiation to produce a third beam of radiation as a second harmonic of the second portion. The mixer is disposed to receive the second and third beams of radiation to produce therefrom a fourth ultraviolet beam of radiation.

In a preferred embodiment, the optical source includes a Nd:YAG laser and a second frequency doubler which frequency doubles the output of the Nd:YAG laser to produce the first beam of radiation at a wavelength of about 532 nm. The OPO produces a second beam of radiation at a wavelength of about 703 nm; while the frequency doubler doubles the 532 nm beam of radiation to produce the third beam of radiation at a wavelength of about 266 nm. The mixer includes a sum frequency mixer which combines the 266 nm and 703 nm beams to produce the fourth beam at a wavelength of about 193 nm, similar to the ArF line of excimer lasers.

In another preferred embodiment, the optical source includes an amplified Nd:YAG-based microchip laser and a second frequency doubler which frequency doubles the output of the amplified microchip laser to produce the first beam of radiation at a wavelength of about 532 nm. The OPO is injection seeded and produces a second beam of radiation at a wavelength of about 851 nm; while the frequency doubler again produces the third beam of radiation at a wavelength of about 266 nm. The mixer includes a four wave difference frequency mixer which combines the second and third beams of radiation to produce the fourth beam at a wavelength of about 157 nm, similar to the fluorine line of excimer lasers. In this embodiment, the microchip laser produces a narrow linewidth output and injection seeding the OPO narrows the linewidth of the beam of radiation produced by the OPO. This is beneficial because the resulting 157 nm fourth beam of radiation will also have a narrow linewidth and corresponding long coherence length. Furthermore, the microchip laser can produce pulses at a high repetition rate, meaning that the overall system will be capable of producing 157 nm pulses at a high repetition rate.

In further accordance with the present invention, a method for producing a coherent beam of ultraviolet radiation includes producing a first beam of coherent radiation and then producing a second beam of radiation from a first portion of the first beam of radiation in an optical parametric process. A third beam of radiation is produced as a second harmonic of a second portion of the first beam of radiation. The second and third beams of radiation are mixed to produce a fourth ultraviolet beam of radiation.

The present invention is particularly advantageous because it only uses three stages (i.e., the OPO, the frequency doubler, and the mixer) to produce ultraviolet beams. This reduces the complexity and cost of the overall approach and increases the overall efficiency. The present invention is also suitable for use with solid state lasers as the optical source, resulting in the general advantages which solid state lasers have over both dye lasers and gas lasers. As another advantage, various embodiments of the present invention may be designed to achieve high repetition rates and/or to produce high quality ultraviolet beams. The use of the OPO, which is wavelength tunable, results in a fourth ultraviolet beam which is also wavelength tunable.

In another aspect of the present invention, an optical system for producing a coherent beam of ultraviolet radiation includes a laser, a fifth harmonic generator, and a Raman shifter. The laser produces a first beam of radiation. The fifth harmonic generator is disposed to receive the first beam of radiation for producing a second beam of radiation at a fifth harmonic of the first beam of radiation. The Raman shifter is disposed to receive the second beam of radiation and anti-Stokes shifts the second beam of radiation to produce a third beam of ultraviolet radiation. In a preferred embodiment, the laser is a Nd:YAG laser which produces the first beam of radiation at a wavelength about 1064 nm and the Raman shifter produces the third beam of radiation at a wavelength about 157 nm, similar to the fluorine line of excimer lasers.

In further accordance with the present invention, a method for producing a coherent beam of ultraviolet radiation comprises the following steps. A first beam of coherent radiation is produced. A second beam of radiation is produced at a fifth harmonic of the first beam of radiation. A third beam of ultraviolet radiation is produced by anti-Stokes shifting the second beam of radiation.

This aspect of the present invention is particularly advantageous because of its simplicity. The result is a low-cost approach to producing radiation at a wavelength close to the fluorine line of excimer lasers.

DETAILED DESCRIPTION OF THE PREFERRED EMBODIMENTS

Figure 1:
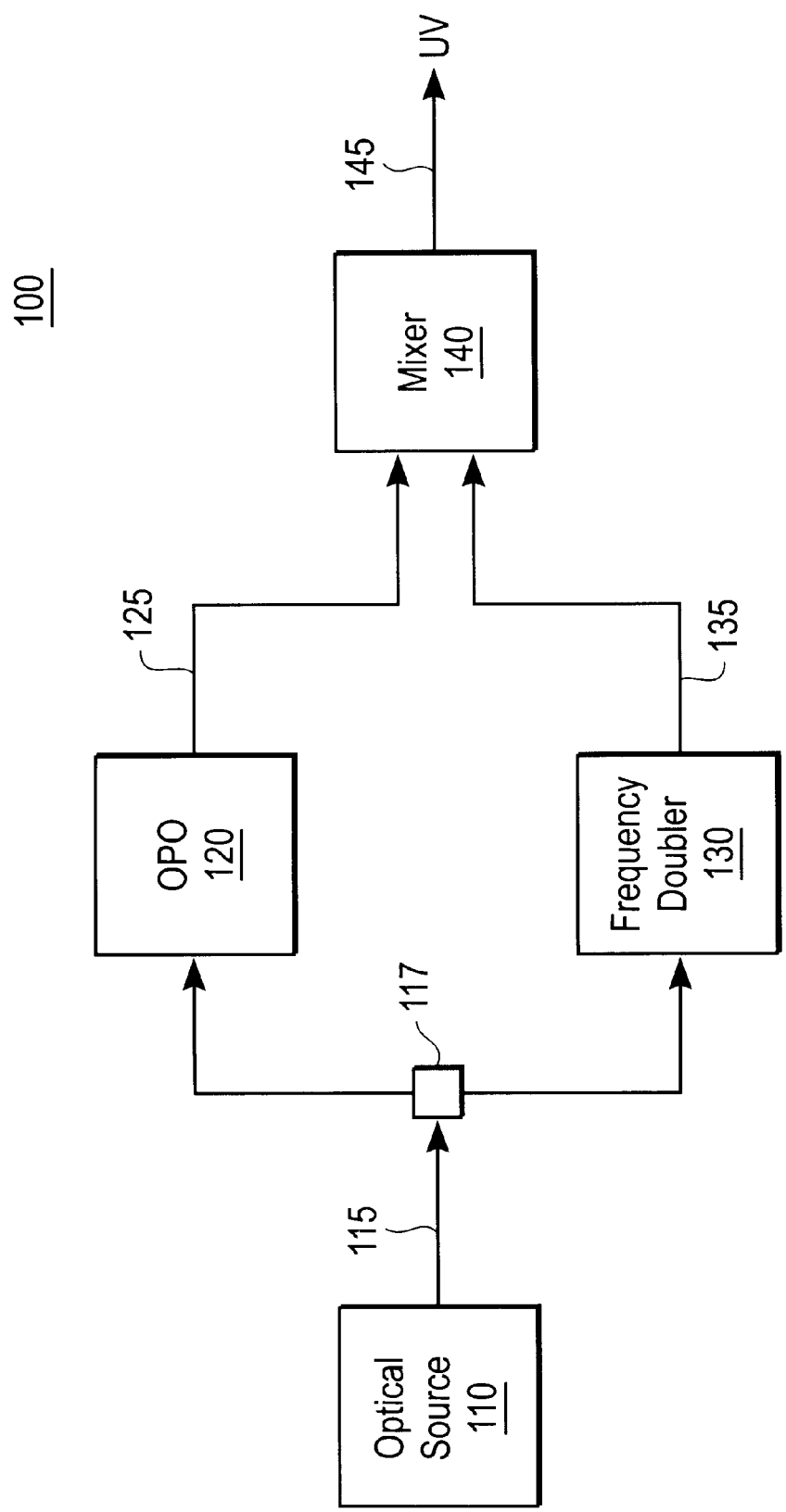
FIG. 1 is a block diagram of an optical system 100 in accordance with the present invention.

Referring now to the block diagram of FIG. 1, there is shown an optical system 100 that includes an optical source 110, an optical parametric oscillator (OPO) 120, a frequency doubler 130, and a mixer 140. The OPO 120 ad frequency doubler 130 are each disposed to receive a portion of a beam of radiation 115 produced by optical source 110; while mixer 140 is disposed to receive beams of radiation 125 and 135 produced by OPO 120 and frequency doubler 130, respectively. The beam of radiation 115 can be split into portions for the OPO 120 and frequency doubler 130 using an optical splitter, including by way of example a beamsplitter.

Figure 2:
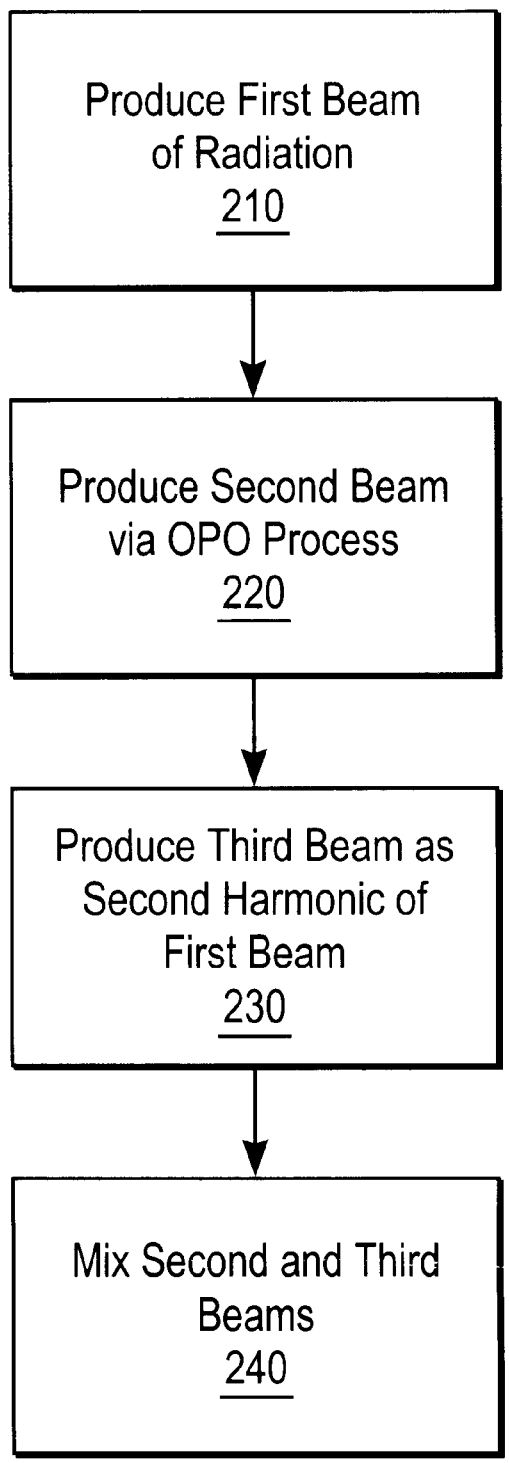
FIG. 2 is a flow diagram illustrating operation of system 100.

Referring now to the flow chart of FIG. 2, the optical source 110 produces 210 a first beam of coherent radiation 115. A first portion of beam 115 is received by OPO 120, which utilizes an optical parametric process to produce 220 a second beam of radiation 125 from the received first portion. A second portion of beam 115 is received by frequency doubler 130, which produces 230 a third beam of radiation 135 from the received second portion. The third beam 135 is produced 230 as a second harmonic of the received second portion. The mixer 140 mixes 240 the second and third beams 125 and 135 to produce a fourth ultraviolet beam 145.

System 100 and the method of FIG. 2 are particularly advantageous because they only use three stages (OPO 120, frequency doubler 130, and mixer 140) to produce ultraviolet beam 145. The low number of stages reduces the complexity and cost of the overall approach and increases the overall reliability and optical efficiency. The use of OPO 120, which is wavelength tunable, also results in an ultraviolet output 145 which is also wavelength tunable.

Figure 3:
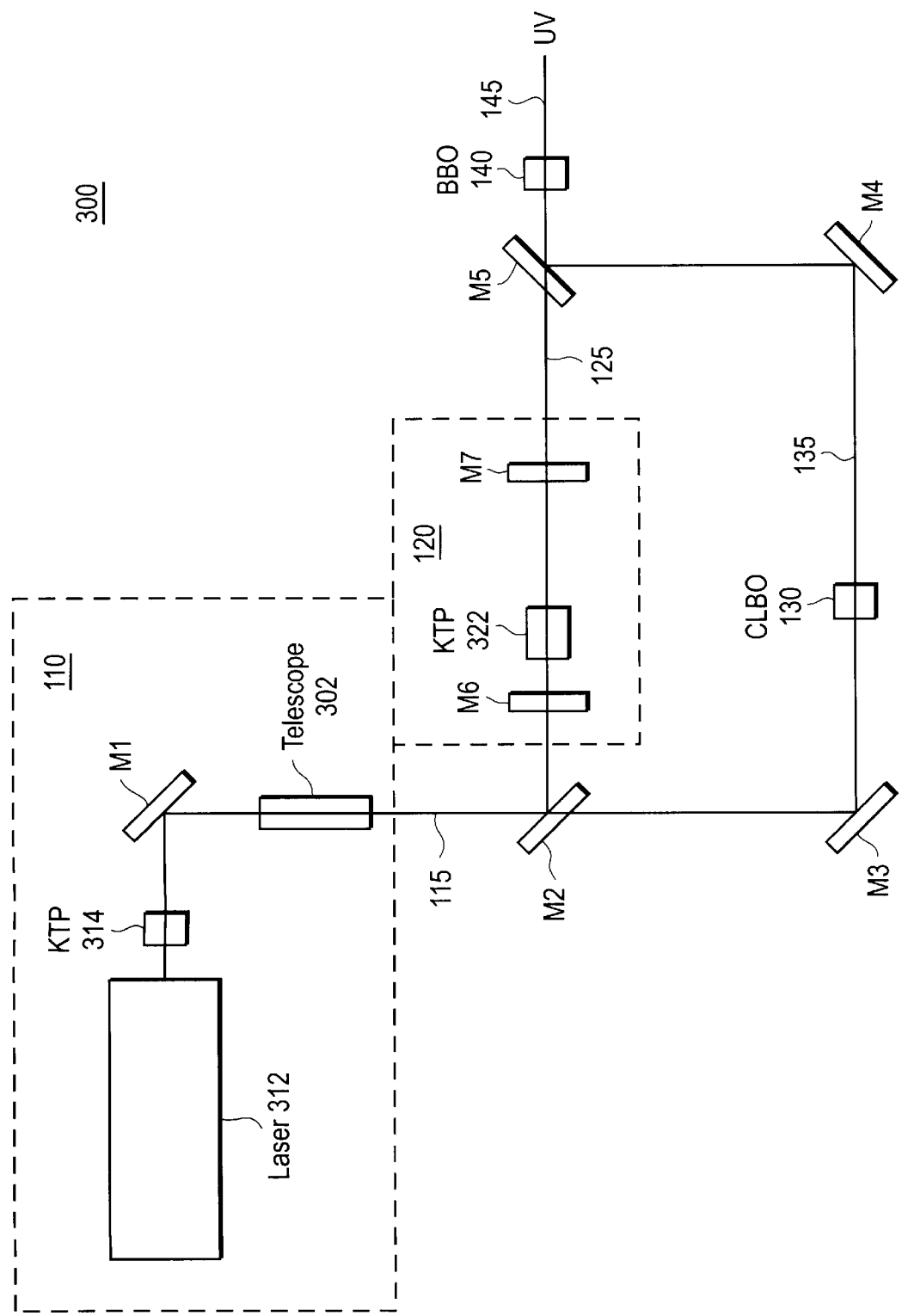
FIG. 3 is a schematic diagram of a preferred embodiment 300 of system 100.

Referring now to the schematic diagram of FIG. 3, the embodiment 300 includes mirrors M2–M5 in addition to the components shown in FIG. 1. In addition, the optical source 110 includes a Nd:YAG laser 312, a frequency doubler 314, a dichroic mirror M1 and a telescope 302. The OPO 120 includes two mirrors M6 and M7 and a potassium titanyl phosphate (KTP) crystal 322. The frequency doubler 130 is a cesium lithium borate (CLBO) crystal and the mixer 140 is a beta barium borate (BBO) crystal which implements sum frequency mixing.

System 300 operates as follows. The optical source 110 produces 210 a beam 115 which lies in the green portion of the visible electromagnetic spectrum, specifically at a wavelength of 532 nanometers (nm) in this particular embodiment. Mirror M2 splits the 532 nm beam 115 into two portions. OPO 120 is pumped by one portion of the 532 nm beam 115 to produce a beam of radiation 125 at a wavelength of 703 nm. The frequency doubler 130 doubles the 532 nm beam 115 to produce a beam of radiation 135 at a wavelength of 266 nm. The mixer 140 sum frequency mixes the 703 nm beam 125 and the 266 nm beam 135 to produce a beam 145 of deep ultraviolet (DUV) radiation at a wavelength around 193 nm, which is the wavelength of radiation produced by the argon fluoride excimer laser.

In more detail, Nd:YAG laser 312 is a Spectra Physics DCR-11 which produces 200 millijoules (mJ), 7 nanosecond (ns) pulses of coherent radiation at a wavelength of 1064 nm and at a repetition rate of approximately 10 herz (Hz). The efficiency of the processes in OPO 120, frequency doubler 130, and mixer 140 increases with the peak power of the pulses, so the pulses preferably should have higher peak powers as long as the peak powers are not sufficiently high to damage any of the components in the system. For pulses of constant energy, the peak power may be increased by decreasing the duration of the pulse. Laser 312 is retrofitted with a small dot Gaussian mirror reflector to configure the pulses of coherent radiation to have a uniform mode of approximately 5 mm diameter, which in turn increases the efficiency of pumping the OPO 120. The pulses preferably are free of rings, hot spots, or other irregularities, since such irregularities can degrade the performance of the OPO 120 and/or damage the crystals 322 within OPO 120. The 1064 nm pulses from laser 312 are frequency doubled to a wavelength of 532 nm by frequency doubler 314, which is a 1 cm long type II KTP crystal in this embodiment. The resulting 532 nm pulses are approximately 100 mJ, 6 ns pulses.

Mirror M1 is a dichroic mirror which passes radiation at a wavelength of 1064 nm but reflects radiation at a wavelength of 532 nm. Hence, the 532 nm pulses produced by frequency doubler 314 are reflected to telescope 302 and residual 1064 nm radiation passes through mirror M1 and exits system 300. Telescope 302 is a down-collimating telescope which reduces the 5 mm diameter beam to a 3 mm diameter beam to match OPO 120 and/or frequency doubler 130. In this embodiment, telescope 302 utilizes a 250 mm positive lens followed by a 150 mm negative lens to achieve the down-collimation. Mirror M2 is a beamsplitter which evenly splits each incoming 3 mm diameter, 100 mJ, 6 ns, 532 nm pulse into two pulses of 50 mJ each, one of which is directed to the OPO 120 and the other of which is directed to the frequency doubler 130.

The OPO 120 of this embodiment includes two plano mirrors M6 and M7 and a type II (i.e., o wave pump and idler, e wave signal) KTP crystal 322 which is 14 mm in length. The cavity for OPO 120 is formed by mirrors M6 and M7, is a flat-flat (i.e., plano-plano) configuration, and is 10 cm in length. Back mirror M6 is highly transmissive at the pump wavelength (i.e., at 532 nm in this embodiment) and highly reflective at the signal wavelength (i.e., at 703 nm). Output coupler M7 is highly reflective at the pump wavelength and partially reflective (30% in this embodiment) at the signal wavelength. The OPO interaction occurs in the x-z crystalline plane with the critical angle theta set to approximately 49.6 degrees.

OPO 120 receives the pump beam at a wavelength of 532 nm and, via the OPO process, produces one signal beam of radiation at a wavelength of 703 nm and another idler beam of radiation at a wavelength of 2187 nm. The signal beam exits the OPO 120 as beam 125 in FIG. 3 as 14 mJ pulses (compared to the 50 mJ incoming pump pulses).

Frequency doubler 130 in this embodiment is a CLBO crystal which is 6 mm high by 6 mm wide by 8 mm long and cut for type I doubling of 532 nm radiation at theta equal to 62 degrees. Although frequency doubler 130 is generating the second harmonic of the incoming 532 nm pulses, it commonly is also referred to as a fourth harmonic generator (or frequency quadrupler) since it is generating the fourth harmonic of the original 1064 nm radiation produced by Nd:YAG laser 312. CLBO has an advantage over BBO of a much larger acceptance angle for quadrupling the Nd:YAG laser (540 microradians per cm for CLBO versus 190 microradians per cm for BBO). In this particular embodiment, the frequency doubler 130 generates 12 mJ pulses of radiation 135 at a wavelength of 266 nm. In other words, approximately 25% of the energy in the incoming 532 nm pulses is frequency doubled to 266 nm. Mirror M3 bends the optical path and directs 532 nm pulses from mirror M2 to the frequency doubler 130. Mirror M4 is a dichroic mirror which reflects radiation at a wavelength of 266 nm and transmits radiation at a wavelength of 532 nm. Hence, the 266 nm pulses produced by frequency doubler 130 are reflected by mirror M4 to combining mirror M5 and residual radiation at a wavelength of 532 nm is transmitted by mirror M4 and exits system 300.

A dichroic mirror M5 reflects radiation at a wavelength of 266 nm and transmits radiation at a wavelength of 703 nm and therefore combines the 703 nm beam 125 from OPO 120 with the 266 nm beam 135 from frequency doubler 130. Both beams 125 and 135 are then directed toward mixer 140. In order to increase the efficiency of mixer 140, beams 125 and 135 preferably overlap as much as possible. Mirror M5 colinearizes the two beams, thus overlapping them in space. Mirrors M4 and M5 may be adjusted to optimize the spatial overlap of the two beams 125 and 135 inside the mixer 140. In addition, since OPO 120 introduces a time delay caused by the build up time of the OPO, the path length from mirror M2 to mirror M5 via frequency doubler 130 is approximately 60 cm longer than the path length from mirror M2 to mirror M5 via OPO 120 in order to compensate for this build-up time. In this manner, the two beams 125 and 135, each of which includes a train of pulses, will also overlap in time. Beams 125 and 135 are preferably polarized in the same direction in order to increase the overlap in polarizations and, in this embodiment, they are preferably vertically polarized (i.e., polarized in the direction perpendicular to the plane of the paper in FIG. 3) for reasons given below.

Mixer 140 in this embodiment is a type I BBO crystal 6 mm high by 6 mm wide by 8 mm long cut at theta equal to 76 degrees. The non-linear coefficient $d_{eff}$ for BBO at this angle is about 0.58 pm/v and the acceptance angle is about 240 microradians/cm. The BBO crystal implements a sum frequency mixing, producing output radiation at a wavelength $\lambda_{out}$ given by:

$$1/\lambda_{out}=1/\lambda_{in1}+1/\lambda_{in2} \qquad \text{(Eq. 1)}$$

where $\lambda_{in1}$ and $\lambda_{in2}$ are the wavelengths of the two incoming beams. In this case, mixer 140 receives the 703 nm beam 125 and the 266 nm beam 135 and sum frequency mixes the two beams to produce a beam of radiation 145 at the ultraviolet wavelength of 193 nm. A wavelength selective device (not shown in FIG. 3) may be used to eliminate unwanted wavelengths which are present in the output beam of radiation 145. A Pellin-Broca prism preferably is used for this purpose, in which case ultraviolet beam 145 is preferably horizontally polarized because this simplifies the corresponding implementation details. In one experiment, the resulting 193 nm pulses 145 were measured to be 600 microJoules ($\mu$J) with a 2 mm diameter, for an energy density of 15 mJ/cm$^2$. The linewidth of these pulses was estimated to be approximately 5 picometers (pm), based on the theoretical bandwidth of one cm$^{-1}$ per cm of interaction length in the BBO sum frequency mixer 140.

The energy density of 15 mJ/cm$^2$ is comparable to that produced by argon fluoride excimer laser tools, making system 300 useful for microlithography purposes at the 193 nm wavelength, including metrology, exposure, and damage testing. System 300, however, does not suffer from the high costs or on-going maintenance requirements typically associated with excimer lasers. Furthermore, the ultraviolet beam 145 produced by system 300 may be tuned over a range of wavelengths by tuning OPO 120 or by changing the wavelength of the radiation produced by laser 312.

Alternate designs for OPO 120 may be used to improve the mode quality of beam 125, resulting in increased mixing efficiency in mixer 140 and/or increased mode quality for beam 145. In addition, operating the CLBO crystal 130 at elevated temperatures has been shown to improve its durability. The linewidth of beam 145 may also be narrowed, for example, by injection seeding the pump laser 312 and/or by changing the design of OPO 120 to narrow the linewidth of its output 125. Linewidths of less than 0.1 pm typically will permit interferometric measurements and patterning of extremely small features in microlithographic applications. As a final example, the efficiency of mixer 140 may be increased by reducing the absorption in BBO crystal 140. Given the high potential linear absorption loss at the 193 nm wavelength, the crystal 140 described in system 300 preferably should be shortened by two to four millimeters. Many of the above alternatives will be illustrated in connection with system 400 of FIG. 4.

Figure 4:
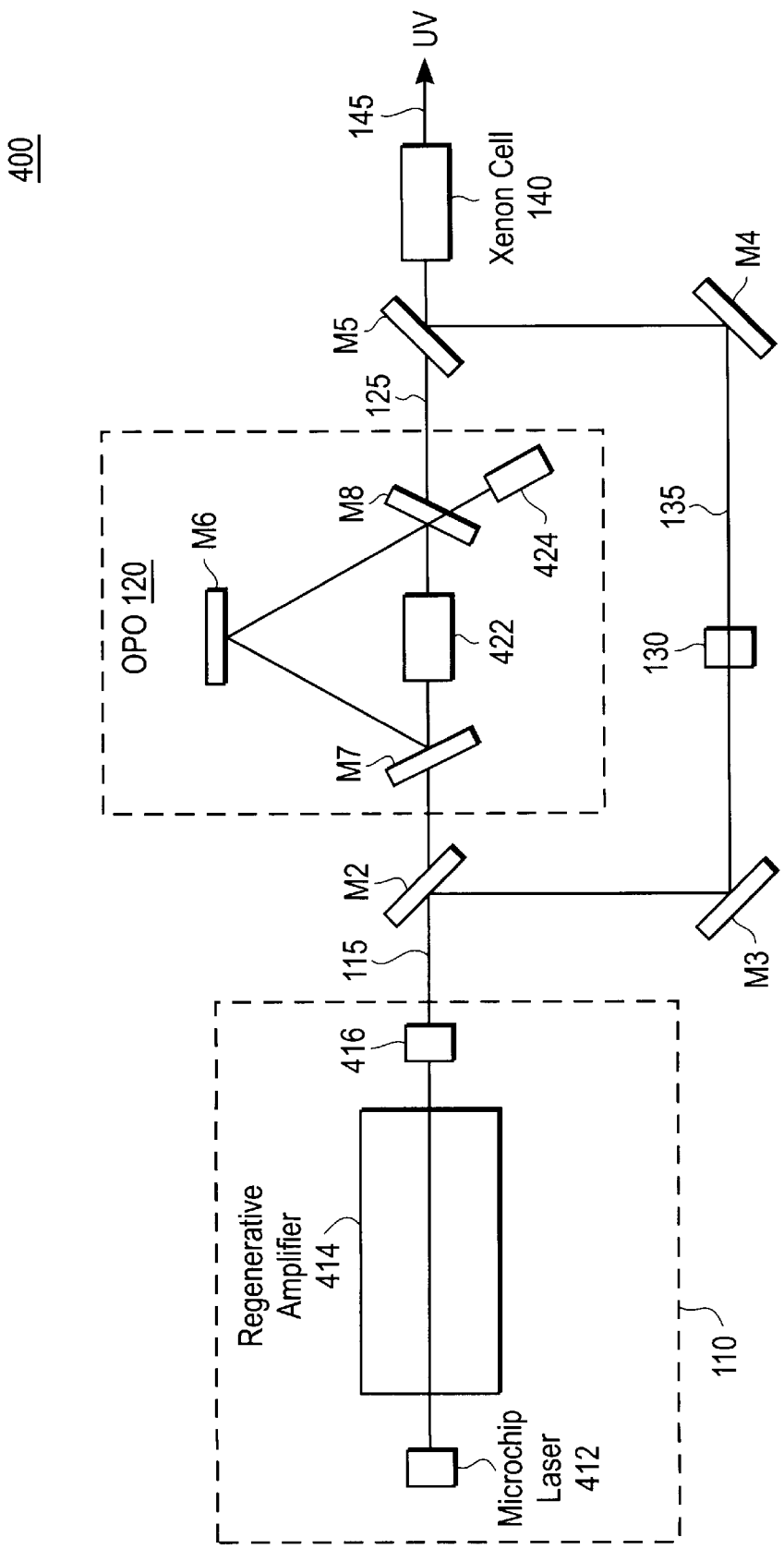
FIG. 4 is a schematic diagram of a second preferred embodiment 400 of system 100.

Referring now to the schematic diagram of FIG. 4, in addition to the components shown in FIG. 1, embodiment 400 further includes mirrors M2–M5 which perform similar functions as mirrors M2–M5 in system 300. In addition, the optical source 110 includes a microchip laser 412, a regenerative amplifier 414, and a frequency doubler 416. The OPO 120 is a ring configuration and includes three mirrors M6–M8, a KTP type II crystal 422 and a diode seeder 424. The frequency doubler 130 is a CLBO crystal and the mixer 140 is a Xenon tube which implements four wave difference frequency mixing.

System 400 is capable of producing narrow linewidth pulses at a high repetition rate (greater than 1 kHz) and with high mode quality. The system 400 operates as follows. The optical source 110 produces 210 a beam 115 which lies in the green portion of the visible an electromagnetic spectrum, specifically at a wavelength of 532 nm in this embodiment. OPO 120 is pumped by the 532 nm beam 115 to produce a beam of radiation 125 at a wavelength of 851 nm. The frequency doubler 130 generates the second harmonic of the 532 nm beam 115 as a beam of radiation 135 at a wavelength of 266 nm. The mixer 140 four wave difference frequency mixes the 851 nm beam 125 and the 266 nm beam 135 to produce a beam of vacuum ultraviolet radiation 145 at a wavelength around 157 nm. The optical source 110 and OPO 120 are designed to produce beams 115 and 125 of narrow linewidth and, as a result, ultraviolet beam 145 also has a narrow linewidth and corresponding long coherence length. Optical source 110 also produces pulses at repetition rates of several kHz, resulting in a repetition rate of several kHz for the ultraviolet beam 145.

In more detail, microchip laser 412 is a compact, passively q-switched diode pumped Nd:YAG laser. The laser 412 produces 5 $\mu$J, 800 picosecond (ps) pulses at a single wavelength of 1064 nm and at a repetition rate of 15 kHz. The pulses contain a single longitudinal mode with an M$^2$ of less than 1.3. The regenerative amplifier 414 includes two birefringence compensated diode pumped Nd:YAG rods (available from CEO Inc.) and a KDP e-o switch/cavity dumper. The use of two laser heads with polarization compensation results in high gain. The amplifier 414 amplifies the pulses from the microchip laser 412 to about 10 mJ and is capable of repetition rates of 2 kHz. Since the microchip laser 412 produces pulses at a rate of 15 kHz and the amplifier 414 amplifies pulses at a rate of 5 kHz, not every pulse is amplified. Accordingly, electronics are used to select which pulse is to be amplified and to gate the entry of the selected pulses into the amplifier 414. A length of fiber (not shown in FIG. 4) is disposed between the microchip laser 412 and amplifier 414 to delay the pulses sufficiently (typ. 50–60 ns) to allow the electronics to perform the gating function. The frequency doubler 416, typically either a BBO or KTP crystal, produces a 6 mJ pulse at the second harmonic (i.e., at a wavelength of 532 nm) of the 10 mJ pulse. Mirror M2 splits the 6 mJ pulses into two portions, one directed to OPO 120 and the other directed to frequency doubler 130.

OPO 120 in this embodiment includes a KTP crystal 422, mirrors M6–M8, and diode seeder 424. Mirrors M6–M8 form a ring cavity for OPO 120, with KTP crystal 422 providing the non-linearity. Mirror M7 transmits the pump beam (at a wavelength of 532 nm); while mirrors M6 and M8 are highly reflective at this wavelength. Similarly, mirror M8 partially transmits (typ. 20–50% transmitting) the outgoing signal beam and incoming injection seed (both at a wavelength of 851 nm), and mirrors M6 and M7 are highly reflective at this wavelength. The diode seeder 424 is an external cavity diode (New Focus Vortex) which produces a single frequency beam of continuous wave radiation at 851 nm. This beam is used to injection seed the OPO 120, thus narrowing the linewidth of beam 125 produced by OPO 120.

OPO 120 receives the pump beam at a wavelength of 532 nm and, via the OPO process, produces two beams of radiation, the signal beam at a wavelength of 851 nm and the idler beam at a wavelength of 1419 nm. The signal beam exits the OPO 120 as beam 125 in FIG. 4. The pulses exiting OPO 120 in this specific embodiment are 0.5 mJ, 500 ps pulses, for a peak power of 1 megawatt (MW). Since the OPO 120 is injection seeded with a single frequency beam of radiation and since the pump beam 115 is also single frequency, the resulting beam 125 will also have a narrow linewidth.

Frequency doubler 130 in this embodiment is a CLBO crystal which frequency doubles the 532 nm beam 115 from optical source 110 (or produces the fourth harmonic of the 1064 nm radiation from microchip laser 412). The frequency doubler 130 produces 1.5 mJ pulses 135 at 266 nm, for a peak power of about 3 MW.

Mixer 140 in this embodiment is a Xenon cell which is approximately 20 cm long by 2 cm in diameter. The input window is fused silica and the output window is calcium fluoride in order to maintain high transmissivity at the relevant wavelengths. The Xenon cell implement as four wave difference frequency mixing, producing output radiation at a wavelength $\lambda_{out}$ given by $$1/\lambda_{out}=1/\lambda_{in1}+1/\lambda_{in1}-1/\lambda_{in2} \quad \text{(Eq. 2)}$$

where $\lambda_{in1}$ and $\lambda_{in2}$ are the wavelengths of the two incoming beams (i.e., 266 nm and 851 nm, respectively). With the previously described pulses 125 and 135, the Xenon cell 140 produces 25 nJ pulses (i.e., 50 W peak power) at the output wavelength $\lambda_{out}$ of approximately 157 nm. These pulses will have narrow linewidth and long coherence length (typ. 20 cm) due to the narrow linewidth components used. The Xenon cell 140 may be followed by a wavelength selective element which separates the 157 nm radiation from radiation at other wavelengths, such as residual radiation at 266 nm and 851 nm. A dispersion chamber with a calcium fluoride prism is suitable for this purpose.

In one application, system 400 may be used as the input to an F2 excimer amplifier since the high repetition rate, narrow linewidth, near diffraction limited pulses produced by system 400 are well-suited for such a purpose. Assuming a gain of 1000 for the F2 amplifier in a triple pass configuration, the pulses produced by system 400 will be amplified to an average power of 10 milliwatts (mW) at the output of the F2 amplifier. In another application, system 400 may be used to injection seed a fluorine excimer laser. These lasers typically have two strong lines, approximately at wavelengths of 157.5 and 157.6 nm. System 400 may be tuned to one of these two lines and then used to injection seed the excimer laser, thus suppressing the other line.

Referring again to FIGS. 1–4, it will be understood that the systems shown are exemplary only and other embodiments will be apparent. For example, optical source 110 from system 400 may be used in system 300, or vice versa. Alternately, Nd:Ylf (at a wavelength of 1047 or 1053 nm), Nd:YV04 (at a wavelength of 1064 nm), or Yb:YAG (tunable around the wavelength of 1030 nm) lasers could be used in place of lasers 312 or 412. Optical source 110 is not limited to solid state lasers; for example, fiber lasers could be used. Injection seeding may be used to narrow the linewidth of optical source 110. In system 400, a multi-pass amplifier may be used rather than regenerative amplifier 414. Frequency doubler 314 and 416 (and also frequency doubler 130) could be based on BBO, lithium triborate (LBO) or any number of other non-linear materials. In another aspect of the invention, separate sources may be used to pump the OPO 120 and frequency doubler 130.

As further examples, the cavity design of OPO 120 may be varied to include a linear configuration as in system 300 or a ring configuration as in system 400. Wavelength-selective elements, such as gratings or prisms, may be introduced into the OPO 120 cavity to narrow the linewidth of the beam 125 produced by OPO 120. Non-linear materials 322 and 422 could be based on potassium titanyl arsenate (KTA), cesium titanyl arsenate (CTA), periodically poled materials such as periodically poled lithium tantalate, or others. Alternatively, OPO 120 may be replaced by an optically pumped laser.

Similarly, mixer 145 may be based on a number of materials or processes. System 300 uses a three-wave sum frequency mixing process and system 400 uses a four-wave difference frequency mixing process. Three-wave difference frequency mixing and four-wave sum frequency mixing may also be used.

Wavelength filtering and selection was achieved primarily by dichroic mirrors and prisms in systems 300 and 400. Other wavelength selective components, such as gratings and filters, may be used.

Systems 300 and 400 are described herein in the context of a fixed wavelength for output beam 145. In fact, the wavelength of output beam 145 may be tuned, most commonly either by rotating OPO 120 to produce a beam 125 of a different wavelength or by tuning the wavelength of optical source 110. If OPO 120 is tuned by rotating, then mixer 140 preferably will also be rotated to maintain the polarization match between OPO 120 and mixer 140. For example, various OPOs will have different ranges for the wavelength of their output beams 125, preferably falling within the range of about 700–1000 nm for systems 300 and 400. Accordingly, the resulting ultraviolet beams 145 may also be tuned, for example, in one instance over the range between about 190–200 nm for system 300 or between about 153–165 nm for system 400.

Figure 5:
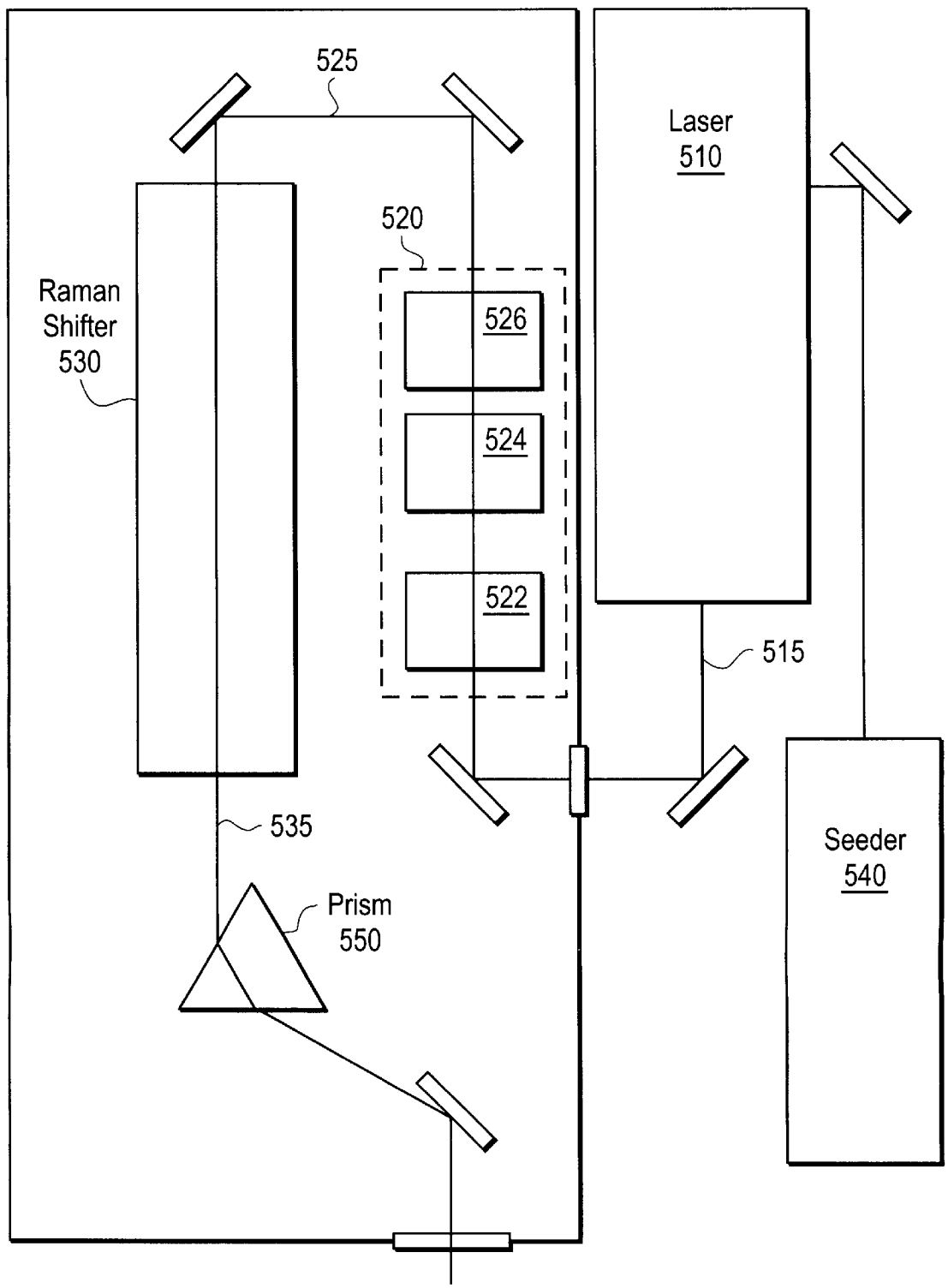
FIG. 5 is a block diagram of another optical system 500 in accordance with the present invention.
Figure 6:
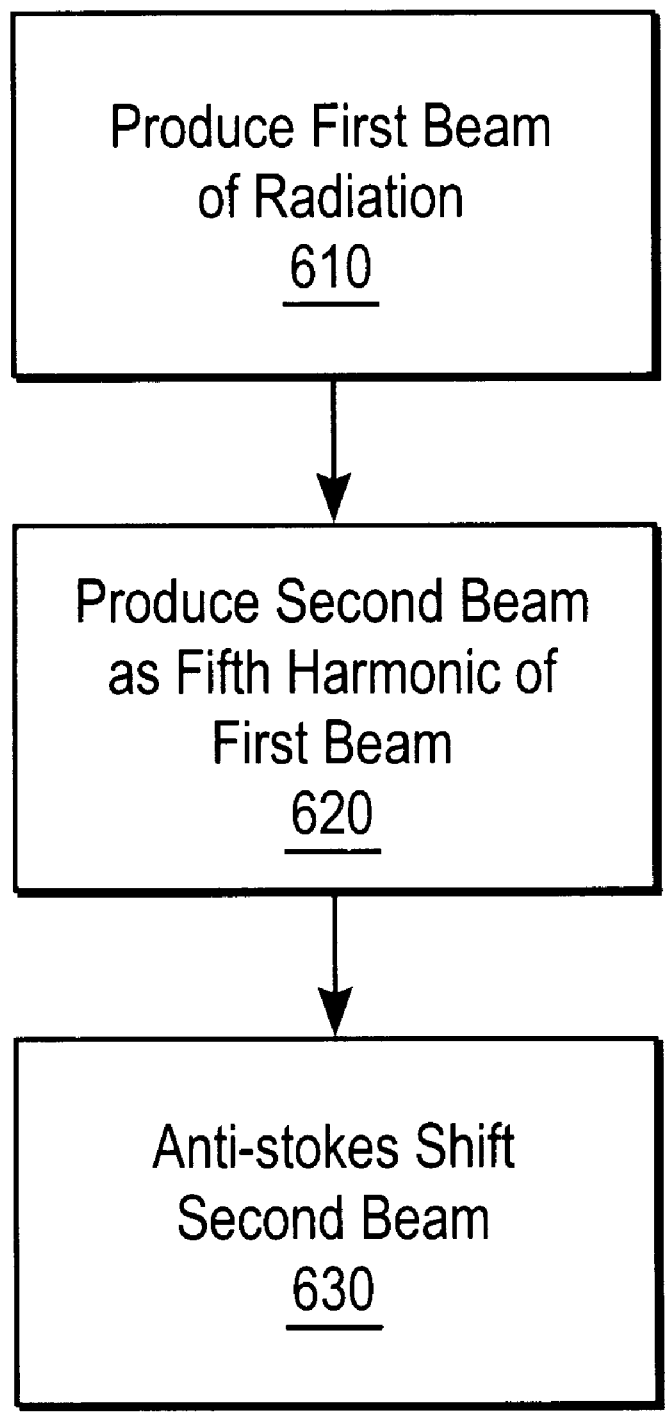
FIG. 6 is a flow diagram illustrating operation of system 500.

Referring now to the block diagram of FIG. 5 and the flow diagram of FIG. 6, system 500 includes a laser 510, a fifth harmonic generator 520, and a Raman shifter 530. Various embodiments may further include a seeder 540 and/or a dispersion prism 550. The laser 510 produces 610 a first beam of radiation 515. The fifth harmonic generator 520 produces 620 a second beam of radiation 525 at a fifth harmonic of the first beam of radiation 515. The Raman shifter 530 anti-Stokes shifts 630 the second beam of radiation 525 to produce a third beam of radiation 535 at the desired ultraviolet wavelength.

The laser 510 in a preferred embodiment is an electro-optic, Q-switched Nd:YAG laser (such as the model Infinity available from Coherent) which can produce 400 mJ, 4 ns pulses 515 at a wavelength of 1064 nm.

The fifth harmonic generator 520 includes in a first stage a second harmonic generator 522, and in a second stage a fourth harmonic generator 524, and in a third stage a fifth harmonic generator 526. In one embodiment, Type I BBO crystals are used for all three stages 522, 524 and 526. In an alternate embodiment, the fourth and fifth harmonic generators 524 and 526 use CLBO crystals. The fifth harmonic generator 520 can produce 25 mJ, 2.5 ns pulses in the fifth harmonic, which is at a wavelength of 213 nm.

The Raman shifter 530 in this embodiment includes a standard 60 cm long Raman shifter tube containing hydrogen as the active gaseous medium. The Raman shifter tube has a fused silica input window and calcium fluoride output window, for effectively transmitting the 213 nm pump beam 525 and the 157 nm output beam 535, respectively. A suitable ultraviolet lens made of material which is transparent at a wavelength of 213 nm (e.g., Suprasil or calcium fluoride) focuses the 213 nm fifth harmonic 525 into the center of the Raman medium and a second suitable ultraviolet lens made material which is transparent at a wavelength of 157 nm (e.g., calcium fluoride) collimates the desired 157 nm output radiation. The hydrogen gas pressure is optimized for $4^{th}$ order anti-Stokes efficiency. The Raman shifter produces a number of different wavelengths (i.e., orders) by stimulated Raman scattering, with the $4^{th}$ order anti-Stokes wavelength being approximately 157 nm. In this embodiment, about 25 mJ of 213 nm radiation is converted to approximately 50 $\mu$J of the $4^{th}$ anti-Stokes order (approximately 0.2% efficiency) at a wavelength of 157 nm.

Prism 550, preferably a calcium fluoride Pellin-Broca prism, may be used to disperse the multiple anti-Stokes up-shifted beams, the pump beam and the multiple Stokes down-shifted beams that are present in the Raman process, with a spatial filter used to selected the desired 157 nm fourth anti-Stokes order. Orders other than the fourth anti-Stokes order may be selected, as desired.

Preferably, system 500 is designed to minimize deleterious absorption by the atmosphere at the 157 nm wavelength.

For example, prism 550 is preferably placed in an evacuated chamber abutted to the Raman shifter 530, or both prism 550 and Raman shifter 530 may be placed in a nitrogen purged chamber.

In an alternate embodiment, single longitudinal mode operation may be achieved by using an injection seeded laser. For example, this may be implemented with a commercially available Quanta Ray or Continuum injection seeded laser for repetition rates of about 10 Hz, a single frequency Coherent infinity laser operating for repetition rates of about 100 Hz, or a system including a laser 510 which is injection seeded by a diode seeder 540 for multi-kilohertz repetition rates. The coherence length of any of these systems is estimated to be about 30 cm (500 MHz bandwidth) with an average power as high as a few mW, depending on the pump source.

What is claimed is:

1. An optical system for producing a coherent beam of ultraviolet radiation comprising:
   an optical source for producing a first beam of coherent radiation at a first wavelength;
   an optical splitter disposed to receive the first beam for splitting the first beam into portions including a first portion and a second portion;
   an optical parametric oscillator disposed to receive the first portion of the first beam of radiation for producing a second beam of radiation at a second wavelength from said first portion;
   a first frequency doubler disposed to receive the second portion of the first beam of radiation for producing a third beam of radiation at a third wavelength as a second harmonic of said second portion; and
   a mixer disposed to receive the second and third beams of radiation for producing an ultraviolet fourth beam of radiation having a fourth wavelength.

2. The optical system of claim 1 wherein the first wavelength lies in a green portion of the visible electromagnetic spectrum.

3. The optical system of claim 2 wherein the first beam of coherent radiation is pulsed at a repetition rate greater than 1 kHz.

4. The optical system of claim 2 wherein the optical source comprises:
   a laser for producing a fifth beam of near-infrared radiation at a fifth wavelength; and
   a second frequency doubler disposed to receive the fifth beam of radiation for producing the first beam of radiation as a second harmonic of the fifth beam of radiation.

5. The optical system of claim 4 wherein the laser comprises a Nd:YAG laser.

6. The optical system of claim 4 wherein the second and third wavelengths are between the fourth and fifth wavelengths.

7. The optical system of claim 1 wherein:
   the optical parametric oscillator is tunable for varying the second wavelength; and
   the fourth wavelength varies responsive to variations in the second wavelength.

8. The optical system of claim 1 wherein the mixer comprises a sum frequency mixer.

9. The optical system of claim 1 wherein the mixer comprises a four wave difference frequency mixer.

10. The optical system of claim 1 wherein the fourth wavelength is approximately equal to a wavelength of radiation produced by an excimer laser.

11. The optical system of claim 10 wherein the fourth wavelength is between about 190–200 nm.

12. The optical system of claim 11 wherein:
    the optical source comprises:
       a Nd:YAG laser for producing a fifth beam of near-infrared radiation at a wavelength of approximately 1 micron, and
       a second frequency doubler disposed to receive the fifth beam of radiation for producing the first beam as a second harmonic of the fifth beam of radiation;
    the optical parametric oscillator is tunable for varying the second wavelength over a range within about 700–1000 nm; and
    the mixer is for sum frequency mixing the second and third beams of radiation to produce the fourth beam of radiation, and the fourth wavelength varies responsive to variations in the second wavelength.

13. The optical system of claim 10 wherein the fourth wavelength is between about 153–165 nm.

14. The optical system of claim 13 wherein:
    the optical source comprises:
       a microchip laser for producing a fifth beam of near-infrared radiation at a single wavelength of approximately 1 micron,
       an amplifier disposed to receive the fifth beam of radiation from the microchip laser for amplifying the fifth beam of radiation, and
       a second frequency doubler disposed to receive the amplified fifth beam of radiation from the amplifier for producing the first beam as a second harmonic of the amplified fifth beam of radiation;
    the optical parametric oscillator comprises an injection seeder for narrowing a linewidth of the second beam of radiation and is tunable for varying the second wavelength over a range within about 700–1000 nm; and
    the mixer comprises a xenon gas cell for four wave difference frequency mixing the second and third beams of radiation to produce the fourth beam of radiation, and the fourth wavelength varies responsive to variations in the second wavelength.

15. The optical system of claim 1 wherein:
    the optical source produces the first beam of radiation with a narrow linewidth; and
    the optical parametric oscillator produces the second beam of radiation with a narrow linewidth.

16. A method for producing a coherent beam of ultraviolet radiation comprising:
    producing a first beam of coherent radiation at a first wavelength;
    splitting the first beam into portions including a first portion and a second portion;
    producing a second of radiation at a second wavelength from the first portion of the first beam of radiation in an optical parametric process;
    producing a third beam of radiation at a third wavelength as a second harmonic of the second portion of the first beam of radiation; and
    mixing the second and third beams of radiation to produce an ultraviolet fourth beam of radiation having a fourth wavelength.

17. The method of claim 16 wherein the first wavelength lies in a green portion of the visible electromagnetic spectrum.

18. The method of claim 17 wherein the first beam of coherent radiation is pulsed at a repetition rate greater than 1 kHz.

19. The method of claim 17 further comprising:

receiving a fifth beam of near-infrared radiation at a fifth wavelength; and producing the first beam of radiation as a second harmonic of the fifth beam of radiation.

20. The method of claim 19 wherein the second and third wavelengths are between the fourth and fifth wavelengths.

21. The method of claim 16 further comprising:

tuning the second wavelength, the fourth wavelength varying responsive to the tuning of the second wavelength.

22. The method of claim 16 wherein mixing the second and third beams of radiation comprises sum frequency mixing the second and third beams of radiation.

23. The method of claim 16 wherein mixing the second and third beams of radiation comprises four wave difference frequency mixing the second and third beams of radiation.

24. The method of claim 16 wherein the fourth wavelength is approximately equal to a wavelength of radiation produced by an excimer laser.

25. The method of claim 24 wherein the fourth wavelength is between about 190–200 nm.

26. The method of claim 25 further comprising:

receiving a fifth beam of near-infrared radiation at a fifth wavelength;

producing the first beam of radiation as a second harmonic of the fifth beam of radiation;

tuning the second wavelength over a range within about 700–1000 nm, the fourth wavelength varying responsive to the tuning of the second wavelength; and wherein mixing the second and third beams of radiation comprises sum frequency mixing the second and third beams of radiation.

27. The method of claim 24 wherein the fourth wavelength is between about 153–165 nm.

28. The method of claim 27 further comprising:

receiving a fifth beam of near-infrared radiation at a fifth wavelength;

producing the first beam of radiation as a second harmonic of the fifth beam of radiation;

tuning the second wavelength over a range within about 700–1000 nm, the fourth wavelength varying responsive to the tuning of the second wavelength; and wherein mixing the second and third beams of radiation comprises four wave difference frequency mixing the second and third beams of radiation.

29. An optical system for producing a coherent beam of ultraviolet radiation comprising:

a laser for producing a first beam of radiation at a first wavelength;

a fifth harmonic generator disposed to receive the first beam of radiation for producing a second beam of radiation at a fifth harmonic of the first beam of radiation; and a Raman shifter disposed to receive the second beam of radiation for anti-Stokes shifting said second beam of radiation producing a third beam of radiation at a third wavelength between about 156–158 nm.

30. The optical system of claim 29 wherein the first wavelength is approximately 1 micron.

31. The optical system of claim 29 wherein the Raman shifter comprises an active gaseous medium of hydrogen.

32. A method for producing a beam of ultraviolet radiation comprising:

producing a first beam of radiation at a first wavelength;

producing a second beam of radiation at a fifth harmonic of the first beam of radiation; and anti-Stokes shifting the second beam of radiation producing a third beam of radiation at a third wavelength between about 156–158 nm.

33. The method of claim 32 wherein the first wavelength is approximately 1 micron.

34. The method of claim 32 wherein anti-Stokes shifting comprising anti-Stokes shifting to the fourth order.

* * * * *

UNITED STATES PATENT AND TRADEMARK OFFICE
CERTIFICATE OF CORRECTION

PATENT NO. : 6,373,869 B1
DATED : April 16, 2002
INVENTOR(S) : James Jeffery Jacob It is certified that error appears in the above-identified patent and that said Letters Patent is hereby corrected as shown below:

<u>Column 12,</u>
Line 53, please insert -- beam -- after "producing a second".

Signed and Sealed this

Twenty-fifth Day of June, 2002

Attest:

Attesting Officer

JAMES E. ROGAN
Director of the United States Patent and Trademark Office